(12) United States Patent
Ikeda et al.

(10) Patent No.: US 11,782,018 B2
(45) Date of Patent: Oct. 10, 2023

(54) GAS SENSOR ELEMENT AND METHOD FOR MANUFACTURING THE SAME

(71) Applicant: DENSO CORPORATION, Kariya (JP)

(72) Inventors: Masatoshi Ikeda, Nisshin (JP); Makoto Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 930 days.

(21) Appl. No.: 16/079,119

(22) PCT Filed: Dec. 14, 2016

(86) PCT No.: PCT/JP2016/087217
§ 371 (c)(1),
(2) Date: Aug. 23, 2018

(87) PCT Pub. No.: WO2017/145499
PCT Pub. Date: Aug. 31, 2017

(65) Prior Publication Data
US 2019/0049404 A1  Feb. 14, 2019

(30) Foreign Application Priority Data
Feb. 24, 2016 (JP) .................................. 2016-033313

(51) Int. Cl.
*G01N 27/41* (2006.01)
*G01N 27/407* (2006.01)
(Continued)

(52) U.S. Cl.
CPC ............. *G01N 27/41* (2013.01); *G01N 27/30* (2013.01); *G01N 27/409* (2013.01); *G01N 27/4075* (2013.01); *G01N 27/416* (2013.01)

(58) Field of Classification Search
CPC ..................... G01N 27/30; G01N 27/4075
See application file for complete search history.

(56) References Cited

U.S. PATENT DOCUMENTS

| 6,420,064 B1 * | 7/2002 | Ghosh | ................ G01N 27/4075 429/489 |
| 7,220,343 B2 * | 5/2007 | Gorte | ................ G01N 27/4074 204/424 |

(Continued)

FOREIGN PATENT DOCUMENTS

| JP | 2000-012042 | 1/2000 |
| JP | 2000-12042 A † | 1/2000 |

(Continued)

OTHER PUBLICATIONS

Japan Patent Office, Written Opinion of the International Searching Authority in PCT/JP2016/087217, dated Mar. 14, 2017, and published Aug. 31, 2017.†

*Primary Examiner* — Caitlyn Mingyun Sun
(74) *Attorney, Agent, or Firm* — Nixon & Vanderhye P.C.

(57) ABSTRACT

A gas sensor element includes a solid electrolyte plate, and a measurement electrode and a reference electrode provided on surfaces of the solid electrolyte plate. In a section plane of the reference electrode along a thickness direction, noble metal regions, solid electrolyte regions, mixed regions, and void spaces are present. When a ratio of an area B of the mixed regions in the section plane with respect to an area A of the reference electrode in the section plane is a mixed region ratio B/A, and a ratio of an area C of the void spaces in the section plane with respect to the area A of the reference electrode in the section plane is a void space ratio C/A, a parameter value as a product of the mixed region ratio B/A and the void space ratio C/A falls within a range of 0.001 to 0.01.

2 Claims, 3 Drawing Sheets

(51) Int. Cl.
*G01N 27/416* (2006.01)
*G01N 27/409* (2006.01)
*G01N 27/30* (2006.01)

(56) References Cited

U.S. PATENT DOCUMENTS

2007/0125664 A1* 6/2007 LaBarge ............ G01N 27/4071
                   205/780.5
2015/0293051 A1* 10/2015 Kajiyama .......... G01N 27/4075
                   204/424

FOREIGN PATENT DOCUMENTS

| JP | 2010-60343 | | 3/2010 | |
|---|---|---|---|---|
| JP | 2010-60343 A | † | 3/2010 | |
| JP | 2014-145607 | | 8/2014 | |
| WO | WO-2014080867 A1 | * | 5/2014 | ......... G01N 27/4075 |

\* cited by examiner
† cited by third party

GAS SENSOR ELEMENT AND METHOD FOR MANUFACTURING THE SAME

CROSS-REFERENCE TO RELATED APPLICATION

This application is the U.S. national phase of International Application No. PCT/JP2016/087217 filed Dec. 14, 2016, which designated the U.S. and claims priority to Japanese Patent Application No. 2016-033313 filed Feb. 24, 2016, the entire contents of each of which are hereby incorporated herein by reference.

TECHNICAL FIELD

The present disclosure relates to a gas sensor element configured such that electrodes are provided on a solid electrolyte, and a method for manufacturing the same.

BACKGROUND ART

In an exhaust system of an internal combustion engine for a vehicle, a gas sensor configured to measure an oxygen concentration or the concentration of specific gas such as NOx (nitrogen oxide) in exhaust gas flowing in the exhaust system is arranged. The gas sensor includes a built-in gas sensor element, and the gas sensor element is manufactured in such a manner that the paste of an electrode material containing noble metal and a solid electrolyte is coated onto a surface of a ceramic sheet forming a solid electrolyte plate and the electrode material and the ceramic sheet are baked.

In the gas sensor element, oxygen ions are generated at a three-phase interface at which oxygen contacts the noble metal and the fixed electrolyte in an electrode, and are conducted in the electrode and the solid electrolyte plate. Thus, the way to effectively cause the noble metal, the solid electrolyte, and measured gas to contact each other in the electrode influences oxygen degradative activity of the gas sensor element.

For example, an electrode for a gas sensor as described in Patent Literature 1 has, in the section thereof, a noble metal region containing noble metal, a solid electrolyte region containing a solid electrolyte, and a mixed region where the noble metal and the solid electrolyte are mixed. The mixed region is formed along a boundary between the noble metal region and the solid electrolyte region. This enhances the efficiency of ionizing oxygen molecules in exhaust gas, and stabilizes sensor output.

Moreover, Patent Literature 2 discloses gas sensor electrode formation metal paste capable of improving oxygen degradative activity of a gas sensor element.

CITATION LIST

Patent Literature

[PTL 1] JP 2014-122878 A
[PTL 2] JP 2014-145607 A

SUMMARY OF THE INVENTION

In the gas sensor element, the oxygen ions generated at the three-phase interface of the electrode are conducted, and hence electron flow occurs. For enhancing the oxygen degradative activity of the gas sensor element, the three-phase interface needs to be increased. However, it has been found that in a case where only the mixed region or the void space is increased for increasing the three-phase interface, the resistance value of the electrode increases and electron movement is interfered. Thus, for enhancing the oxygen degradative activity of the gas sensor element, the three-phase interface needs to be formed in such a suitable range that the resistance value is kept low.

The present disclosure provides a gas sensor element configured such that mixed regions and void spaces are present in a section plane of an electrode to keep the resistance value of the electrode low and to enhance oxygen degradative activity, and a method for manufacturing the same.

A gas sensor element according to one aspect of the present disclosure includes a solid electrolyte plate exhibiting oxygen ion conductivity, a measurement gas chamber into which a measured gas is introduced formed in contact with a first surface of the solid electrolyte plate, a measurement electrode disposed on the first surface of the solid electrolyte plate in a state of being arranged in the measurement gas chamber, a reference gas chamber into which a reference gas is introduced formed in contact with a second surface of the solid electrolyte plate, and a reference electrode disposed on the second surface of the solid electrolyte plate in a state of being arranged in the reference gas chamber. The measurement electrode and the reference electrode contain noble metal containing platinum, and a solid electrolyte made of the type of ceramic material identical to a ceramic material forming the solid electrolyte plate. In a section plane of a specific electrode which is one of the measurement electrode and the reference electrode along a thickness direction, a noble metal region where the noble metal is agglomerated, a solid electrolyte region where the solid electrolyte is agglomerated, a mixed region where the noble metal and the solid electrolyte are distributed, and a void space are present. Mixed regions and the void spaces are present near the noble metal region. The mixed region is formed by mixing the noble metal in the noble metal region and the solid electrolyte in the solid electrolyte region or the solid electrolyte plate at the boundary between the noble metal region and the solid electrolyte region or the solid electrolyte plate. A parameter value as the product of a mixed region ratio B/A indicating the ratio of the area B of the mixed region in the section plane with respect to the area A of the specific electrode in the section plane and a void space ratio C/A indicating the ratio of the area C of the void space in the section plane with respect to the area A of the specific electrode in the section plane falls within a range of 0.001 to 0.01.

In the above-described gas sensor element, the mixed region ratio B/A and the void space ratio C/A are measured in the section plane of the electrode along the thickness direction. Mixed regions and the void spaces are present in the section plane of the electrode such that the parameter value falls within a range of 0.001 to 0.01. This can keep the resistance value of the electrode low, and can enhance oxygen degradative activity of the gas sensor element.

On the other hand, in a case where the parameter value is less than 0.001 or exceeds 0.01, the resistance value of the electrode increases, and therefore, the oxygen degradative activity of the gas sensor element cannot be enhanced. The void spaces in the section plane include opened void spaces connected to a surface of the electrode, and void spaces isolated within the electrode. The area A of the electrode in the section plane is the total area of the noble metal region, the solid electrolyte region, the mixed region, and the isolated void space. When the area A is obtained, the solid electrolyte region is a solid electrolyte region separated and isolated from the solid electrolyte forming the solid electrolyte plate.

The "mixed region" is a region which is neither the noble metal region nor the solid electrolyte region of an entire region excluding the void space in the section plane of the electrode and which contains both the noble metal and the solid electrolyte. In the mixed region, the noble metal and the solid electrolyte are in such a three-dimensional intricate shape that the noble metal and the solid electrolyte are entangled with each other. Moreover, in the mixed region, the phase of the noble metal and the phase of the solid electrolyte are entangled in a marbled fashion. Further, at least part of the noble metal and the solid electrolyte in the mixed region exhibits a phase continuous to the noble metal in the noble metal region, the solid electrolyte in the solid electrolyte region, or the solid electrolyte plate.

In a case of observing the section plane of the electrode, the mixed region is a region where multiple boundaries between the noble metal and the solid electrolyte are present. The region where multiple boundaries between the noble metal and the solid electrolyte are present indicates a region where two or more boundaries between the noble metal and the solid electrolyte are present. In other words, the region where multiple boundaries between the noble metal and the solid electrolyte are present indicates that the noble metal and the solid electrolyte are not divided in two only by a single continuous curved line.

BRIEF DESCRIPTION OF THE DRAWINGS

The above-described objects, features, and advantageous effects of the present disclosure and other objects, features, and advantageous effects of the present disclosure are more clarified from the following detailed description with reference to the attached drawings. These drawings are.

DESCRIPTION OF EMBODIMENTS

Hereinafter, an embodiment of the above-described gas sensor element and a method for manufacturing the same will be described with reference to FIGS. 1 to 4.

Figure 1:
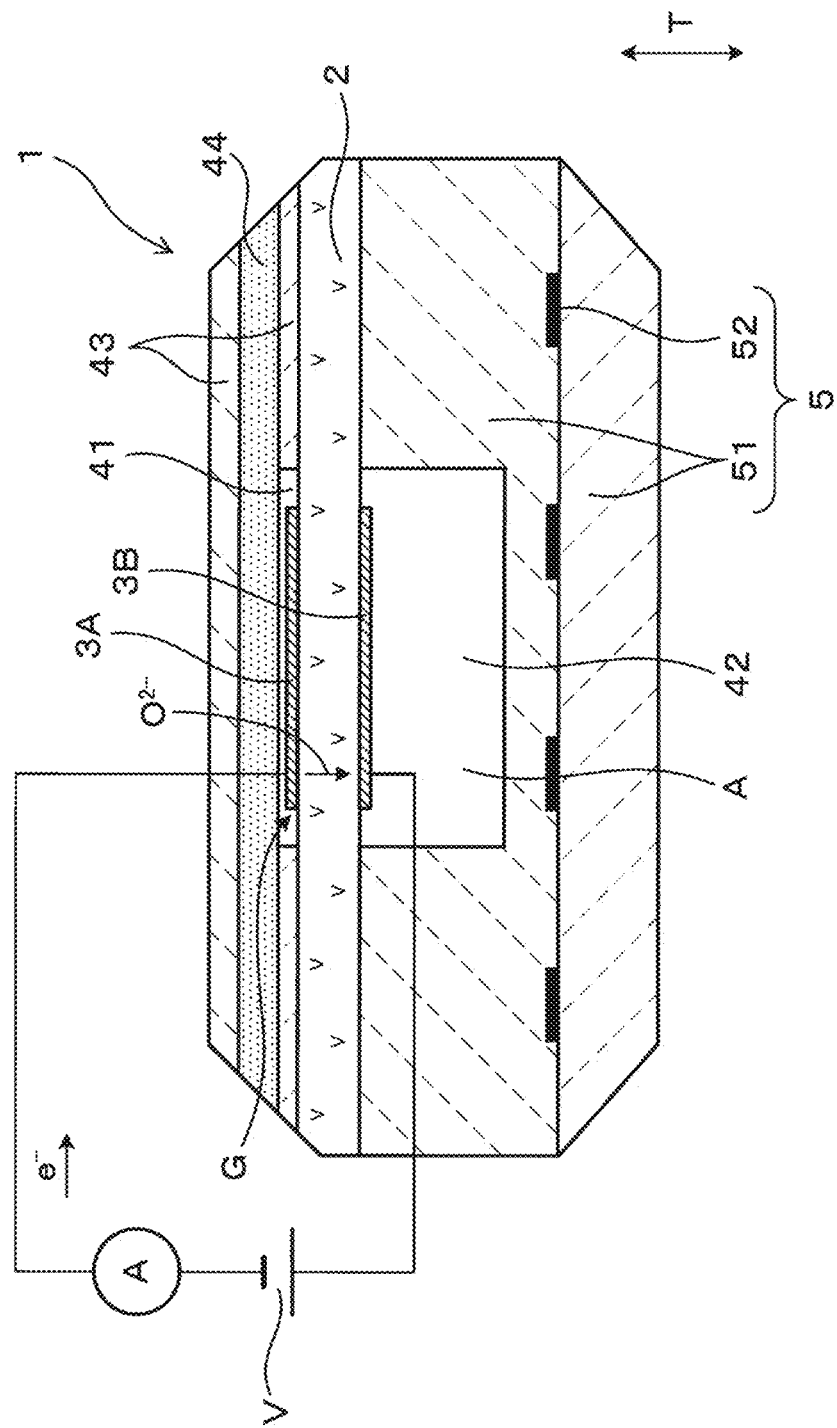
FIG. 1 is a sectional view for describing a gas sensor element having a measurement electrode and a reference electrode in an embodiment.
Figure 2:
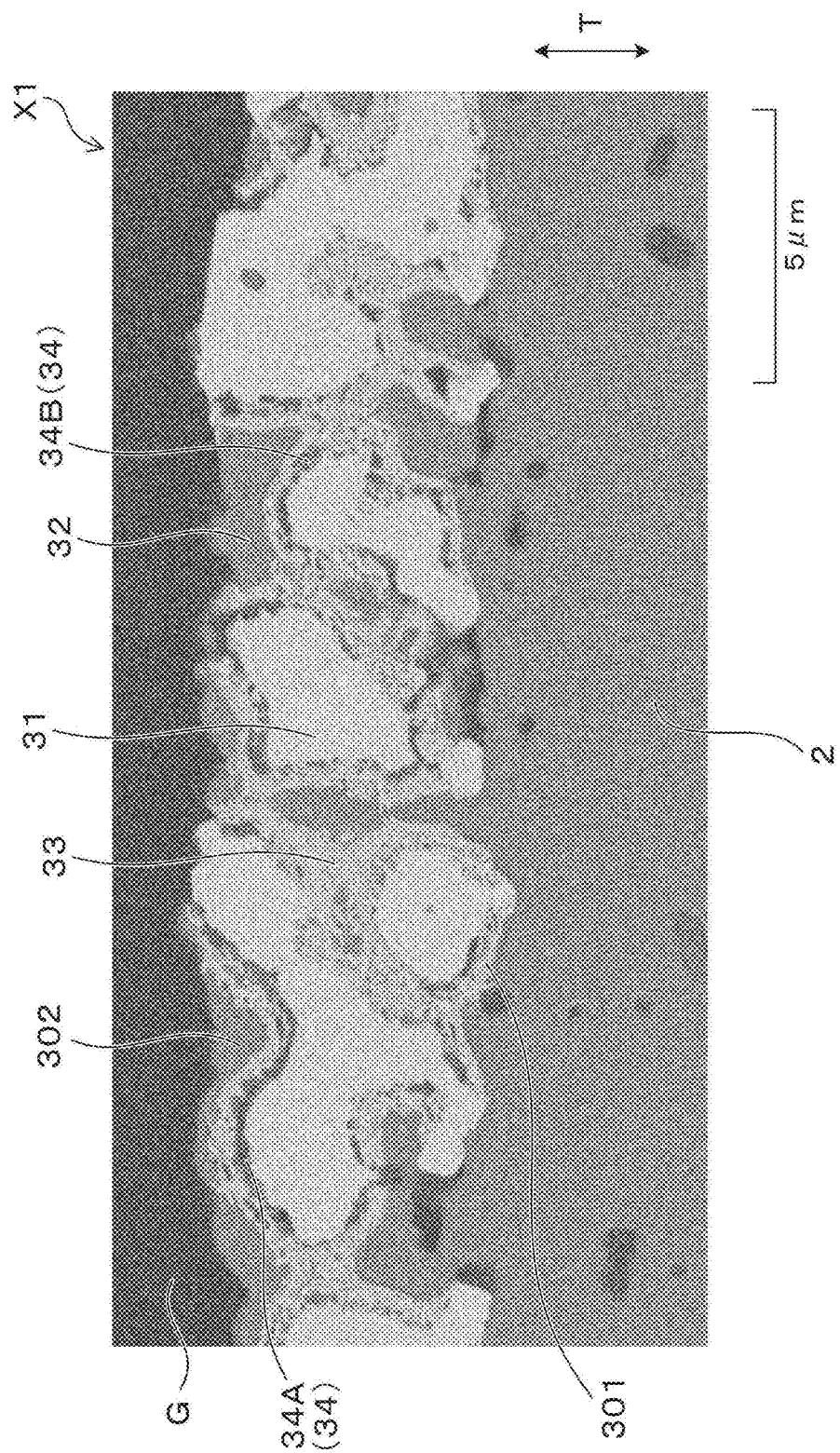
FIG. 2 is a photograph of a section plane of the reference electrode in the embodiment.

As illustrated in FIG. 1, a gas sensor element 1 of the present embodiment includes a solid electrolyte plate 2 exhibiting oxygen ion conductivity, and a measurement electrode 3A and a reference electrode 3B provided on surfaces of the solid electrolyte plate 2. Each electrode 3A, 3B contains noble metal containing platinum, and a solid electrolyte made of the same type of ceramic material as a ceramic material forming the solid electrolyte plate 2. As illustrated in FIG. 2, in a section plane X1 of the reference electrode 3B along a thickness direction T, noble metal regions 31 where the noble metal is agglomerated, solid electrolyte regions 32 where the solid electrolyte is agglomerated, mixed regions 33 where the noble metal and the solid electrolyte are distributed, and void spaces 34 are present.

A ratio of an area B of the mixed regions 33 in the section plane X1 with respect to an area A of the reference electrode 3B in the section plane X1 is herein referred to as a "mixed region ratio B/A." Moreover, a ratio of an area C of the void spaces 34 in the section plane X1 with respect to the area A of the reference electrode 3B in the section plane X1 is herein referred to as a "void space ratio C/A." Further, a parameter value as the product of the mixed region ratio B/A and the void space ratio C/A falls within a range of 0.001 to 0.01. In addition, the void space ratio C/A is equal to or less than 0.3. Note that the parameter value is 0.1% in percentage in a case where the parameter value is 0.001, and is 1% in percentage in a case where the parameter value is 0.01.

The gas sensor element 1 is arranged in an exhaust pipe of an internal combustion engine, and uses exhaust gas passing through the exhaust pipe as measured gas G and atmospheric air as reference gas A to obtain the oxygen concentration of the measured gas G.

The gas sensor element 1 of the present embodiment forms an A/F sensor utilizing limiting current properties based on the diffusion limitation of the measured gas G to obtain an A/F (i.e., an air-fuel ratio) in the engine in a quantitative way. Alternatively, the gas sensor element 1 may form a concentration cell sensor configured to detect whether the air-fuel ratio as a mixing ratio between fuel and air in the engine is, with respect to a theoretical air-fuel ratio, in a rich state with excess fuel or in a lean state with excess air. As another alternative, the gas sensor element 1 may form a NOx sensor configured to measure a NOx concentration in the measured gas G.

As illustrated in FIG. 1, the solid electrolyte plate 2 is made of yttria-stabilized zirconia in a plate shape. The electrodes 3A, 3B include the measurement electrode 3A provided on a first surface of the solid electrolyte plate 2 and exposed to the measured gas G, and the reference electrode 3B provided on a second surface of the solid electrolyte plate 2 and exposed to the reference gas A. A measurement gas chamber 41 into which the measured gas G is introduced is formed on the first surface of the solid electrolyte plate 2, and the measurement electrode 3A is arranged in the measurement gas chamber 41. The measurement gas chamber 41 is formed such that an insulator 43 and a diffusion resistive layer 44 allowing the measured gas G to pass at a predetermined diffusion speed surround the measurement gas chamber 41.

A reference gas chamber 42 into which the reference gas A is introduced is formed on the second surface of the solid electrolyte plate 2, and the reference electrode 3B is arranged in the reference gas chamber 42. A heater 5 laminated in the thickness direction T of the solid electrolyte plate 2 includes heating elements 52 configured to generate heat by energization, and ceramic substrates 51 embedding the heating elements 52. The reference gas chamber 42 is formed such that the ceramic substrate 51 surrounds the reference gas chamber 42.

As illustrated in this figure, the gas sensor element 1 of the present embodiment is, as the A/F sensor, used in such a manner that a predetermined voltage V exhibiting the limiting current properties is applied to between the measurement electrode 3A and the reference electrode 3B. Oxygen molecules $O_2$ in the measured gas G receive, mainly at each interface between the noble metal and the solid electrolyte in mixed regions of the measurement electrode 3A, electrons $e^-$ to turn into oxygen ions $O^{2-}$. Then, the oxygen ions $O^{2-}$ pass through the solid electrolyte plate 2. The oxygen ions $O^{2-}$ having passed through the solid electrolyte plate 2 transfer, at each interface between the noble metal and the solid electrolyte in the mixed regions of the reference electrode 3B, the electrons $e^-$ to turn into oxygen molecules $O_2$ again. Note that the same applies to conduction of the oxygen ions $O^{2-}$ in each electrode 3A, 3B for discharging oxygen contained in the measured gas G in a case where the gas sensor element 1 forms the NOx sensor. Moreover, in a case where the gas sensor element 1 forms the concentration cell sensor, the oxygen ions $O^{2-}$ are conducted from the reference electrode 3B to the measurement electrode 3A.

The solid electrolyte plate 2 is formed such that many crystal particles made of the yttria-stabilized zirconia are gathered. The crystal particles are connected to each other. The electrodes 3A, 3B contain crystal particles of the platinum as the noble metal, and crystal particles of the yttria-stabilized zirconia as the solid electrolyte, i.e., the material shared with the solid electrolyte plate 2.

FIG. 2 shows a photograph of the section plane X1 of the reference electrode 3B along the thickness direction T of the gas sensor element 1. This photograph was taken in such a manner that the section plane X1 of the reference electrode 3B is photographed by a scanning electron microscope (i.e., SEM).

As shown in FIG. 2, the mixed regions 33 of the platinum and the solid electrolyte are distributed across the substantially entirety of the reference electrode 3B in the section plane X1. The mixed regions 33 are, in the reference electrode 3B, formed from a boundary position 301 with the solid electrolyte plate 2 to a surface position 302 across the entire area other than a portion with the noble metal regions 31, the solid electrolyte regions 32, and the void spaces 34. The mixed regions 33 are formed as portions where multiple boundaries between the platinum and the solid electrolyte are present. In each mixed region 33, the platinum and the solid electrolyte are in such a three-dimensional intricate shape that the platinum and the solid electrolyte are entangled with each other. Moreover, a part of the platinum in the mixed region 33 exhibits a phase continuous to the platinum in the noble metal region 31, and a part of the solid electrolyte in the mixed region 33 exhibits a phase continuous to the solid electrolyte in the solid electrolyte region 32 or the solid electrolyte plate 2. Note that although not shown in the figure, material distribution similar to that of the reference electrode 3B is also shown in a section plane of the measurement electrode 3A.

As shown in FIG. 2, the void spaces 34 include, in the section plane X1 of the reference electrode 3B, open-shaped opened void spaces 34A recessed from the surface of the reference electrode 3B, and close-shaped isolated void spaces 34B formed inside the reference electrode 3B. Each void space 34 is three-dimensionally continuously formed, and the isolated void space 34B might be the opened void space 34A as viewed in a different section plane X1. Moreover, the surface position 302 of the reference electrode 3B is formed in a complicated uneven shape.

Many void spaces 34 including the opened void spaces 34A and the isolated void spaces 34B are formed at portions adjacent to the mixed regions 33. Many three-phase interfaces among the noble metal and the solid electrolyte in the mixed regions 33 and atmospheric air in the void spaces 34 are formed at the periphery of the mixed regions 33. Each mixed region 33 is formed in such a manner that energization processing is performed for the gas sensor element 1 to mix, at an interface between the noble metal region 31 and the solid electrolyte region 32 or the solid electrolyte plate 2, the noble metal in the noble metal region 31 and the solid electrolyte in the solid electrolyte plate 2 or the solid electrolyte region 32.

In the gas sensor element 1 of the present embodiment, a three-phase interface formation amount in the reference electrode 3B is represented by the parameter value as the product of the mixed region ratio B/A indicating the ratio of the area B of the mixed regions 33 where the noble metal and the solid electrolyte are distributed and the void space ratio C/A indicating the ratio of the area C of the void spaces 34 into which oxygen is introduced. The mixed region ratio B/A and the void space ratio C/A are measured in the section plane X1 of the reference electrode 3B along the thickness direction T thereof.

Figure 3:
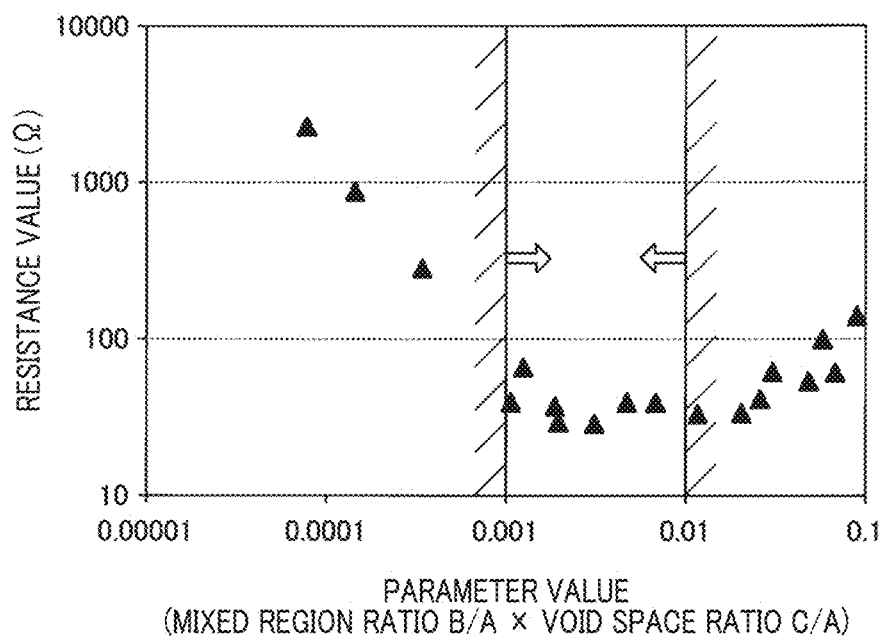
FIG. 3 is a graph showing a relationship between the product of a three-phase interface ratio and a void space ratio in the reference electrode and a resistance value in the embodiment.

FIG. 3 shows a relationship between the parameter value (–) as the product of the mixed region ratio B/A and the void space ratio C/A and a resistance value ($\Omega$). A formation area of the reference electrode 3B in the gas sensor element 1 as described herein is, in the section plane X1 of the gas sensor element 1, an area where the solid electrolyte regions 32 separated and isolated from the solid electrolyte forming the solid electrolyte plate 2, the noble metal regions 31, the mixed regions 33, and the isolated void spaces 34B are formed. The area A of the reference electrode 3B in the section plane X1 is an entire area including the noble metal regions 31, the solid electrolyte regions 32 separated and isolated from the solid electrolyte plate 2, the mixed regions 33, and the isolated void spaces 34B. The area B of the mixed regions 33 in the section plane X1 can be easily obtained as portions isolated from the solid electrolyte plate 2, the noble metal regions 31, and the solid electrolyte regions 32. The area C of the void spaces 34 in the section plane X1 is, in the section plane X1, obtained as the area of the isolated void spaces 34B present in the reference electrode 3B.

The parameter value is represented by the product of the mixed region ratio B/A and the void space ratio C/A, and is a value variable by variation in any of the mixed region ratio B/A and the void space ratio C/A. Note that in the reference electrode 3B, most of the mixed regions 33 and the isolated void spaces 34B are formed adjacent to each other, and the area B of the mixed regions 33 and the area C of the isolated void spaces 34B are in a substantially proportionate relationship. Thus, there is little probability that only either one of the mixed region ratio B/A or the void space ratio C/A greatly varies, and the parameter value is a value indicating, as the product of the mixed region ratio B/A and the void space ratio C/A, the three-phase interface formation amount (i.e., a perimeter) in the section plane X1 of the reference electrode 3B.

In the gas sensor element 1 of the present embodiment, a suitable three-phase interface formation amount for enhancing oxygen degradative activity of the gas sensor element 1 is represented using the parameter value as a scale. It has been found that the magnitude of the parameter value influences the resistance value of the reference electrode 3B and therefore the resistance value of the gas sensor element 1.

As shown in FIG. 3, the resistance value is provided as a value obtained in such a manner that current flowing upon voltage application to between the pair of the electrodes 3A, 3B provided on the solid electrolyte plate 2 is measured. That is, the resistance value in FIG. 3 is provided as the resistance value of the entirety of the solid electrolyte plate 2 and the pair of electrodes 3A, 3B. Note that a change in the resistance value reflects a change in the resistance value of the reference electrode 3B. Thus, a change in the resistance value of the entirety of the solid electrolyte plate 2 and the pair of electrodes 3A, 3B can be taken as a scale indicating a change in the resistance value of the reference electrode 3B.

A graph shown in FIG. 3 is obtained in such a manner that for each of samples of the gas sensor element 1 with different energization times and application voltages in the energization processing, the mixed region ratio B/A and the void space ratio C/A in the section plane X1 of the reference electrode 3B are measured and the resistance value is measured. The mixed region ratio B/A and the void space ratio C/A as described herein can be obtained in such a manner that the reference electrode 3B is cut by a laser etc. and such a section plane X1 is observed by the scanning electron microscope (i.e., SEM).

The resistance value in FIG. 3 is maintained at a low value of equal to or less than about 80Ω in a case where the parameter value falls within a range of 0.001 to 0.01. Moreover, in a case where the parameter value is less than 0.001, a smaller parameter value results in a greater resistance value. Reasons are assumed as follows: the ratios of the mixed regions 33 and the isolated void spaces 34B in the reference electrode 3B decrease; and as a result, the three-phase interface formation amount in the reference electrode 3B decreases, and movement of the oxygen ions $O^{2-}$ and the electrons $e^-$ decreases.

On the other hand, in a case where the parameter value exceeds 0.01, a greater parameter value results in a greater resistance value. Reasons are assumed as follows: the ratio of the isolated void spaces 34B in the reference electrode 3B increases, and as a result, movement of the electrons $e^-$ is interfered.

The resistance value of each electrode 3A, 3B indicates easiness of movement of the electrons $e^-$ when the oxygen ions $O^{2-}$ are conducted in the gas sensor element 1, and serves as a scale influencing the quality of the oxygen degradative activity of the gas sensor element 1. It has been found that an extremely-small or extremely-great three-phase interface formation ratio in the reference electrode 3B results in a great resistance value of the reference electrode 3B, and therefore, results in lower oxygen degradative activity of the gas sensor element 1. On the other hand, the following has been found: the three-phase interface formation ratio in the reference electrode 3B is set such that the above-described parameter value falls within a range of 0.001 to 0.01; and in this manner, the resistance value of the reference electrode 3B is kept low, and the oxygen degradative activity of the gas sensor element 1 can be maintained high.

Moreover, in the present embodiment, a suitable range of the ratio of the isolated void spaces 34B in the reference electrode 3B has been checked.

Figure 4:
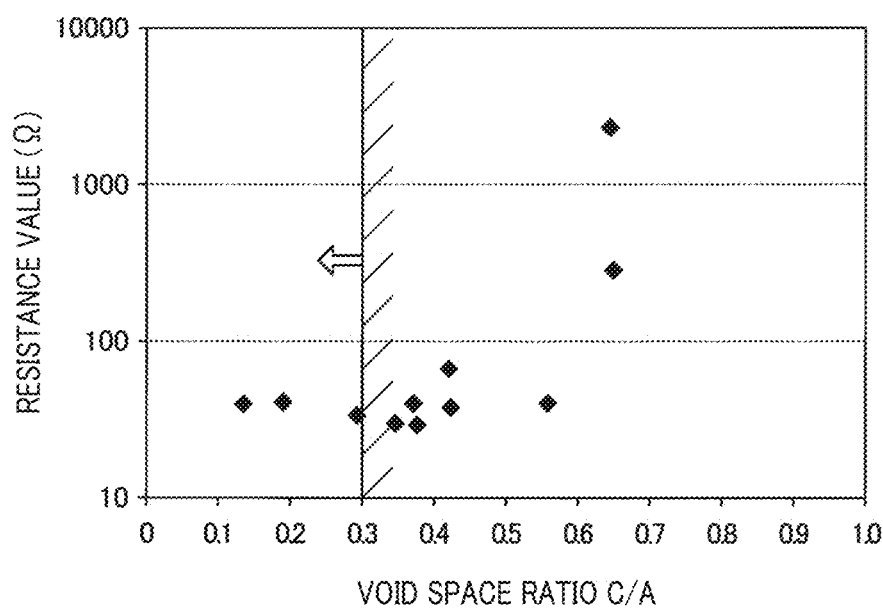
FIG. 4 is a graph showing a relationship between the void space ratio in the reference electrode and the resistance value in the embodiment.

FIG. 4 shows a relationship between the void space ratio C/A (–) and the resistance value (Ω). A graph shown in this figure is obtained in such a manner that for each of the samples of the gas sensor element 1 with different energization times and application voltages in the energization processing, the void space ratio C/A in the section plane X1 of the reference electrode 3B is measured and the resistance value is measured.

As shown in FIG. 4, in a case where the void space ratio C/A indicating the ratio of the isolated void spaces 34B exceeds 0.3, a greater void space ratio C/A results in a greater resistance value. Reasons are assumed as follows: movement of the electrons $e^-$ is interfered as in the case of FIG. 3. On the other hand, in a case where the void space ratio C/A is equal to or less than 0.3, the resistance value is maintained at a low value of equal to or less than about 80Ω. This result shows that a void space ratio C/A of equal to or less than 0.3 keeps the resistance value of the reference electrode 3B low and can maintain high oxygen degradative activity of the gas sensor element 1.

Next, the method for manufacturing the gas sensor element 1 of the present embodiment will be described.

Upon manufacturing of the gas sensor element 1, electrode material paste for forming each electrode 3A, 3B is, as a coating step, first coated to both surfaces of a ceramics sheet for forming the solid electrolyte plate 2. Then, the insulator 43, the diffusion resistive layer 44, and each sheet of the heater 5 are stacked on the ceramic sheet of the solid electrolyte plate 2, thereby forming an element intermediate.

Subsequently, the element intermediate is, as a baking step, heated and baked at a temperature of 1400 to 1500 degrees C. with pressure being applied in an element intermediate stacking direction, and in this manner, an element baked body is obtained such that each electrode 3A, 3B is formed on the solid electrolyte plate 2. In each electrode 3A, 3B of the element baked body, many noble metal regions 31 where the noble metal is agglomerated and many solid electrolyte regions 32 where the solid electrolyte is agglomerated are present, and the presence ratio of the void spaces 34 is low. Moreover, in each electrode 3A, 3B of the element baked body, almost no mixed regions 33 are present.

Finally, a portion between the pair of electrodes 3A, 3B sandwiching the solid electrolyte plate 2 in the element baked body is energized as an energization step. At the energization step, the element baked body is arranged under a temperature environment of 800 to 900 degrees C., and a voltage of 1.5 to 2.5 V is applied to between the pair of the electrodes 3A, 3B for a predetermined time (e.g., 5 to 300 seconds).

At this point, it is assumed that the noble metal in the noble metal regions 31 of the reference electrode 3B penetrates into the solid electrolyte in the solid electrolyte regions 32 of the reference electrode 3B and the solid electrolyte in the solid electrolyte plate 2. Moreover, it is assumed that the energization step forms the mixed regions 33 where the noble metal and the solid electrolyte are distributed in a patchy fashion, and with movement of the noble metal, forms the void spaces 34 in the vicinity of a portion where the noble metal was present before movement. Moreover, in the measurement electrode 3A, the mixed regions 33 and the void spaces 34 are also formed as in the reference electrode 3B.

At the energization step, the element baked body is arranged under a temperature environment of 800 to 900 degrees C., the temperature environment being lower than a baking temperature. This can suppress oxygen in the solid electrolyte in the solid electrolyte plate 2 from flowing out (i.e., blackening) while promoting movement of the noble metal in the noble metal regions 31. Moreover, a voltage of 1.5 to 2.5 V is applied to between the pair of the electrodes 3A, 3B for the predetermined time, the voltage being higher than the voltage (e.g., 0.1 to 1.0 V) applied to the pair of electrodes 3A, 3B upon use (i.e., measurement) of the gas sensor element 1. This also can suppress the solid electrolyte plate 2 from blackening while promoting movement of the noble metal in the noble metal regions 31.

In a case where normal temperature environment is lower than 800 degrees C. or a case where the voltage to be applied upon energization is lower than 1.5 V, not only the energization time needs to be increased, but also there is a probability that the mixed regions 33 and the void spaces 34 cannot be sufficiently formed. Moreover, in a case where the normal temperature environment exceeds 900 degrees C. or a case where the voltage to be applied upon energization exceeds 2.5 V, not only movement of the noble metal in each electrode 3A, 3B is promoted, but also blackening of the solid electrolyte plate 2 is promoted. This might lead to a probability that the solid electrolyte plate 2 is degraded.

The present disclosure is not limited to the above-described embodiment, and various embodiments can be made without departing from the scope of the present disclosure. For example, an electrode configured such that the above-described parameter value falls within a range of 0.001 to 0.01 can be used as the measurement electrode 3A. In this case, the noble metal in the measurement electrode 3A may contain gold in addition to the platinum. In a case of employing the gas sensor element 1 for the NOx sensor, the noble metal in the measurement electrode 3A may contain rhodium etc. in addition to the platinum.

What is claimed is:

1. A gas sensor element comprising:
a solid electrolyte plate exhibiting oxygen ion conductivity;
a measurement gas chamber into which a measured gas is introduced formed in contact with a first surface of the solid electrolyte plate;
a measurement electrode disposed on the first surface of the solid electrolyte plate in a state of being arranged in the measurement gas chamber;
a reference gas chamber into which a reference gas is introduced formed in contact with a second surface of the solid electrolyte plate; and
a reference electrode disposed on the second surface of the solid electrolyte plate in a state of being arranged in the reference gas chamber; wherein
the measurement electrode and the reference electrode contain noble metal containing platinum, and a solid electrolyte made of a type of ceramic material identical to a ceramic material forming the solid electrolyte plate,
a solid electrolyte region where the solid electrolyte is agglomerated, a mixed region where the noble metal and the solid electrolyte are distributed, and a void space are present in a section plane of a specific electrode which is one of the measurement electrode and the reference electrode along a thickness direction,
a noble metal region where the noble metal is agglomerated,
the mixed region and the void space are present near the noble metal region;
the mixed region is formed by mixing the noble metal in the noble metal region and the solid electrolyte in the solid electrolyte region or the solid electrolyte plate at the boundary between the noble metal region and the solid electrolyte region or the solid electrolyte plate;
a parameter value as a product of a mixed region ratio B/A indicating a ratio of an area B of the mixed region in the section plane with respect to an area A of the specific electrode in the section plane and a void space ratio C/A indicating a ratio of an area C of the void space in the section plane with respect to the area A of the specific electrode in the section plane falls within a range of 0.001 to 0.01, and
the void space ratio C/A is equal to or less than 0.3.

2. A method for manufacturing a gas sensor element including a solid electrolyte plate exhibiting oxygen ion conductivity and a pair of electrodes provided on both surfaces of the solid electrolyte plate, comprising:
a coating step of coating paste for forming the pair of electrodes to both surfaces of a ceramics sheet for forming the solid electrolyte plate, thereby forming an element intermediate;
a baking step of baking the element intermediate to form an element baked body; and
an energization step of passing an electrical current through a portion between the pair of electrodes in the element baked body, wherein
the paste contains noble metal containing platinum, and a solid electrolyte made of a type of ceramic material identical to a ceramic material forming the solid electrolyte plate,
at the energization step, the element baked body is arranged under a temperature environment of 800 to 900 degrees C. and a voltage of 1.5 to 2.5 V is applied to between the pair of electrodes in the element baked body, and in this manner, a noble metal region where the noble metal is agglomerated, a solid electrolyte region where the solid electrolyte is agglomerated, a mixed region where the noble metal and the solid electrolyte are distributed, and a void space are present in a plane of section of the pair of electrodes along a thickness direction,
a parameter value as a product of a mixed region ratio B/A indicating a ratio of an area B of the mixed region of a specific electrode of the pair of electrodes in the section plane with respect to an area A of the specific electrode in the section plane and a void space ratio C/A indicating a ratio of an area C of the void space of the specific electrode in the section plane with respect to the area A of the specific electrode in the section plane falls within a range of 0.001 to 0.01, and
the void space ratio C/A is equal to or less than 0.3.

* * * * *